METHOD OF PRODUCING SUPERCONDUCTIVE TAPES OR BANDS

United States Patent Office 3,443,304

Patented May 13, 1969

3,443,304

METHOD OF PRODUCING SUPERCONDUCTIVE TAPES OR BANDS

Richard Maier, Erlangen, Germany, assignor to Siemens Aktiengesellschaft, a corporation of Germany Filed Dec. 9, 1966, Ser. No. 600,584
Claims priority, application Germany, Dec. 11, 1965, S 100,910
Int. Cl. B23k *1/20, 31/02*
U.S. Cl. 29—472.1 15 Claims

ABSTRACT OF THE DISCLOSURE

A substance consisting of the component of a superconductive two-component intermetallic compound which melts at a lower temperature than the other component thereof is interposed between respective pairs of an odd number of component bands consisting of that component of the compound which melts at a higher temperature, one of the component bands respectively being smooth and the band adjacent thereto being provided on both sides thereof with depressions. The composite band or tape thus formed is subjected to a heat treatment whereby the lower melting component is indiffused into the higher melting component and reacts therewith to form layers of the superconductive intermetallic compound. The depressions are of such depth and the lower melting component is of such amount that, during the heat treatment, the lower melting component is retained between the bands of the higher melting component by capillary action.

My invention relates to method of producing superconductive tapes or bands.

Superconductive wires and tapes have found a multiplicity of uses in electrical technology because the ohmic resistance thereof completely disappears when they are in superconductive condition. Great advantages are therefore to be expected in particular from the use of superconductors for the winding of superconductor coils to produce high magnetic fields.

Superconductors which are to be employed for producing high magnetic fields must possess a high critical magnetic field, i.e. they have to transform from superconductive to normally conductive condition only in very high magnetic fields.

The two-component metallic compounds niobium-tin ($Nb_3Sn$) and vanadium-gallium ($V_3Ga$), in particular, are examples of superconductors with high critical magnetic fields. The critical magnetic field of niobium-tin is approximately 220 kilo-oersteds (koe.) at a temperature of 4.2° Kelvin. The transition point of this compound, at which it is transformed from superconductive to normally conductive condition, is at approximately 18° Kelvin. Vanadium-gallium has a transition point of approximately 14.5° Kelvin and has a critical magnetic field of about 250 to 270 koe. at a temperature of 4.2° Kelvin. In addition to both of the aforementioned compounds, other two-component intermetallic compounds have already become known as effective superconductors. For example, intermetallic compounds containing niobium, vanadium or tantalum i.e. tantalum-tin ($Ta_3Sn$), niobium-gallium ($Nb_3Ga$), niobium-aluminum ($Nb_3Al$) and vanadium-tin ($V_3Sn$) are now known. The formulas shown hereinabove in parentheses are only the approximate chemical composition of the individual compounds. They are respectively related to an intermetallic phase having β-tungsten (A15) crystal structure.

Several methods for producing superconductive wires or bands are already known in the art wherein superconductive intermetallic compounds serve as the superconductive material.

In one known method, a niobium tube is filled with a mixture of niobium and tin powder and then drawn out to form a wire. After the wire has attained its final form, for example is wound into a coil, it is heated to incandescence in order to produce a coherent superconductive coil by interdiffusion of niobium and tin in the interior of the wire (J. E. Kunzler, Review of Modern Physics, 33 (1961), 501). In another known method, superconductive surface layers are produced by the interdiffusion of tin into niobium bands or wires. The bands or wires are thus either immersed in a tin melt, are placed in the hot vapor atmosphere above the melt or are cold-coated with a layer of tin and thereafter heated to incandescence (E. Saur & J. Wurm, Naturwissenschaften, 49 (1962) 127). In a further known method, an $Nb_3Sn$-layer is deposited on a wire or band-shaped metallic carrier by the reduction of gaseous chlorides of niobium and tin (French Patent 1,322,777). The foregoing known methods and the bands and wires produced thereby are subject to various disadvantages.

The method according to Kunzler, particularly the thin-drawing of the niobium tube filled with metal powder, is relatively complicated. The wires produced according to this method must first be brought to their final form before the diffusion process can be carried out. For voluminous devices, such as larger coils, this involves great difficulties. It is impossible to change the final shape of the device, such as a coil, after heating the same to incandescence, without seriously impairing the superconductive characteristics of the wire.

The layers of superconductive intermetallic compounds produced by diffusion or deposition from the gas phase onto the surface of bands or wires must be very thin in order to be elastically deformable. Since the superconductive layers for these wires and bands are not located in the neutral fibers thereof but rather on the outer surface of the supporting band or wire, there is danger that the layers will tear when subjected to bending stresses or moments that occur during the winding of a coil. Moreover, these bands and wires must be electrically insulated from one another because the superconductive layer is located on the surface thereof.

Two improved methods of producing superconductive bands with layers of a superconductive two-component intermetallic compound have heretofore been proposed which avoid the aforementioned disadvantages of the foregoing known methods. In the first of these proposed improved methods for producing superconductive bands, there is interposed between two bands consisting of the higher melting component of the compound being produced (for example niobium), a band-shaped layer consisting of the lower melting component of the compound (for example tin). The edges of the bands of the higher melting component are then welded to one another and the tape thus produced is subjected to a heat treatment whereby the material of the lower melting component is indiffused into the material of the higher melting component and forms therewith a layer of the superconductive intermetallic compound. By welding the edges of the bands of the higher melting component, outward flow or spreading of the lower melting component during the heat treatment is thus prevented.

With the second proposed improved method which is simpler by comparison with the first improved method mentioned, a layer of tin is interposed between two niobium bands for producing superconductive tapes with layers of the superconductive intermetallic compound niobium-tin ($Nb_3Sn$). The tape thus consisting of three laminations is subjected to a heat treatment at a temperature between about 950 and 1200° C. at which the tin melts, indiffuses into the niobium bands and reacts therewith to form niobium-tin layers. During this process, a constant interspace of less than 50μ width is maintained between the niobium bands, and the molten tin is thus retained by capillary action between the niobium bands. Welding the edges of the niobium bands is dispensed with in performing this method.

It is an object of my invention to provide a method of producing superconductive tapes or bands with layers of a superconductive two-component intermetallic compound which is even further simplified when compared with the aforementioned two improved methods of production, and permits the production of tapes or bands having even better characteristics than are obtainable by the aforementioned two improved methods of production.

With the foregoing and other objects in view, I provide in accordance with my invention a sandwich-type tape formed of an odd number of component bands consisting of that component of a superconductive two-component intermetallic compound which melts at a higher temperature, one of the component bands respectively being smooth and the band adjacent thereto being provided on both sides thereof with depressions, a substance consisting of the component of the compound melting at a lower temperature being interposed between respective pairs of these component bands. The tape or composite band thus formed is subjected to heat treatment whereby the lower melting component is indiffused into the higher melting component and reacts therewith to form layers of the superconductive intermetallic compound. The size or depth of the depressions and the amount of the lower melting component are such that, during the heat treatment, the lower melting component is retained between the bands of the higher melting component by capillary action.

The superconductive tapes or bands produced by the method of my invention as compared to the superconductive wires and bands produced in accordance with the previously known methods, possess the same advantages as those bands which are produced in accordance with both of the previously proposed improved methods. The superconductive layers are located close to the neutral axis or fiber of the tape or band and are therefore only exposed to slight stresses due to bending of the band. Furthermore, they can be formed so thin by suitable heat treatment that they are elastically deformable. The bands can thus be readily deformed, for example by being wound into a coil after the heat treatment, i.e. after formation of the superconductive layers. Heat treatment of the completed coil is unnecessary. The externally located material of the high melting component of the compound confers a distinctive strength or stability to the tape or band.

The method of my invention furthermore permits the production of tapes or bands with four or more superconductive layers in an essentially simpler manner than has been possible heretofore by the two aforementioned known improved methods. Welding the edges of the bands of the higher melting component of the compound as in the first proposed known improved method is unnecessary in the method of the instant invention. With respect to the second proposed known improved method, the sandwich-like construction of the tape of component bands formed from the high-melting component material in successive alternating rows of a smooth band and a band provided on both sides with depressions, offers an essentially simplified possibility of retaining during the heat treatment the lower melting component material within the tape by capillary action. In the aforeproposed known improved method, the requirement of maintaining a constant interspace between the bands of the higher melting component and of providing the suitable means therefor, would cause great difficulties in the production of superconductive bands with more than two superconductive layers. In the method of my invention, this requirement is dispensed with by the use of bands provided with depressions on both sides thereof.

Since the sandwich-like tape or band is formed of an uneven number of component bands of the high melting component material, that is of at least three bands, and the material of the low melting component located between these bands reacts with each band of a respective pair of adjacent bands to form a respective superconductive layer, the superconductive tapes or bands produced in accordance with the method of my invention thus possess in the interior thereof at least four layers of a superconductive intermetallic compound. The tapes or bands accordingly exhibit a higher critical current intensity than the bands with two superconductive layers of the same thickness produced according to the aforementioned known improved methods. By critical current intensity is meant the intensity wherein the superconductive tape or band transforms from superconductive to normally conductive condition for a predetermined magnetic field. Also, the critical current density, which is of prime significance in the use of superconductive bands for producing superconductive magnetic coils, is higher for bands produced in accordance with the method of my invention than for bands produced in accordance with the previously mentioned known improved methods.

With the method of my invention, the lower melting component, which melts at the beginning of the heat treatment and at first only rather poorly wets the material of the high melting component, is retained by capillary action in the interspaces between the smooth bands and the bands provided with depressions, both of which consist of the higher melting component. Bands provided with depressions on both sides having a depth of about 2 to 15μ are particularly suitable therefor. The depressions can have varied shape; for example, the bands can be provided with numerous parallel extending longitudinal trenches, with transverse grooves or furrows, with fine holes, or with completely irregularly distributed depressions. It has been found to be particularly advantageous and relatively simple to employ bands which are deformed non-uniformly by means of a roller with a rough surface. Bands of this type can be produced, for example, by impressing indentations by means of a corundum or silicon carbide grinding wheel in a smooth band disposed on a hard rubber base.

The number of bands of the high-melting component material employed for forming the sandwich-like tape or band primarily depends upon the later use of the band, because the deformability thereof reduces with increasing thickness of the band. In order to achieve a high current density for the completed superconductive tape or band, which is necessary for attaining a high filling factor, for example in a superconductive coil whose windings are produced from the tape, the bands consisting of the higher melting component employed as starting material for producing the tape or composite band should be as thin as possible. A lower limit for the tape or band thickness is in principle only determined by the required strength or stability of the tapes or bands as well as by the thickness of the layers of the superconductive compound produced during the heat treatment. Good results are obtained with starting material in the form of bands having a thickness of about 10μ. In the production of good flexible superconductive tapes or bands by the method of my invention for windings of coils with relatively small radii of curvature, it has been found desirable to employ three bands of the high melting component material of the superconductive compound for constructing the sandwich-like tape or composite band, the middle component band of the three being provided with depressions on both sides thereof. Sandwich-like superconductive tapes or composite bands constructed of five of such component bands still have relatively good flexibility. Superconductive tapes which are constructed of even a greater number of component bands of the higher melting component material of the compound are, on the other hand, primarily suitable for large magnetic coils with large radii of curvature. Since they comprise numerous superconductive layers, they have exceptionally high critical current intensities.

The method according to my invention is eminently suitable for producing tapes or bands with superconductive layers of niobium-tin and, moreover, affords the possibility of also producing tapes or bands with layers of other superconductive intermetallic compounds containing one of the elements vanadium, niobium, or tantalum as the higher melting component, and one of the elements aluminum, gallium, or tin as the lower melting component. Thus, in addition to niobium-tin, these are, in particular, the aforementioned compounds tantalum-tin, niobium-aluminum, niobium-gallium, vanadium-gallium and vanadium-tin.

The material of the lower melting component of the superconductive compound can be interposed in various ways between the bands of the higher melting component during construction of the sandwich-like tape or composite band. In one form of the method of my invention, the material of the lower melting component is inserted in the form of a band between the bands of the higher melting component. In another form of the method of my invention, to introduce the material of the lower melting component, every second component band of the higher melting component material is coated with a layer of the lower melting component material before construction of the sandwich-like tape or composite band. The coating of these bands can be effected preferably electrolytically or by a deposition process from the vapor state. When using gallium as the lower melting component material, due to the low melting point thereof, deposition is virtually the only process suitable for introducing the lower melting component between the bands of the higher melting component. Moreover, the deposition process is recommended when using a large number of bands of the high melting component for constructing the sandwich-like tape or composite band, because the construction thereof is thereby simplified.

During the heat treatment of the sandwich-like tape or band, the lower melting component partly indiffuses into the adjacent bands of the higher melting component and forms, by reaction with the material of the higher melting component, cohesive layers of the intermetallic superconductive compound. The thickness of the formed layers depends upon the applicable temperature and upon the length of time during which the band is subjected to the heat treatment. The higher the temperature and the longer the duration of the heat treatment, the thicker are the layers. In order to achieve a high flexibility of the band, the layers of superconductive compound should be kept as thin as possible. On the other hand, in order to achieve a high current density, the layers should not be too thin. A layer thickness of approximately 1 to 2$\mu$ has been found to be desirable both for achieving good flexibility as well as high current density. Since the band should be kept as thin as possible in order to achieve a high current density and therewith a desirable packing factor when winding a superconductive coil, too great a supply of the material of the lower melting component, which causes thicker non-reacting layers of this material within the band, should be avoided as much as possible. Thus, for the method of my invention, the lower melting component material to be introduced between two respective bands of the higher melting component of the intermetallic compound is advantageously of such quantity that it is exactly sufficient for filling up the interspace between both bands and for forming respectively a layer of the superconductive compound having a thickness of substantially 1 to 2$\mu$ with both adjacent bands.

The duration of the heat treatment and the temperatures necessary therefor are dependent, on the one hand, upon the materials employed and, on the other hand, upon the desired thickness of the superconductive layers. In general, when carrying out the method of my invention, the bands are subjected to temperatures between approximately 950 and 1200° C. for a period of time ranging from several minutes to several hours. Due to the dependence of the thickness of the superconductive layers upon the temperature level and the duration of the heat treatment, a superconductive layer of the same thickness can be produced by increasing the temperature while reducing the duration of the heat treatment. For example, it has been found to be desirable in the production of tapes with niobium-tin layers, to subject the tape to temperatures of approximately 1000° C. for a heat treatment period of about 10 to 60 minutes, to temperatures of about 1100° C. for a heat treatment duration of about 5 to 30 minutes, and to temperatures of about 1200° C. for a heat treatment period of about 2.5 to 15 minutes. The heat treatment is advantageously carried out in one or more run-through furnaces. The term "duration of the heat treatment" is to be understood to be the period of time within which a specific portion of the tape is located within the zone of the indicated temperature in the furnace. The speed with which the tape can traverse the furnace during the heat treatment depends upon the temperature selected for the heat treatment and the length of the furnace.

In accordance with other features of the method of my invention, the heat treatment is advantageously carried out in several steps in one or more run-through furnaces in such a way that the sandwich-like tape or composite band repeatedly passes through serially arranged zones of high temperature. In the interest of effecting efficient production of the tapes, relatively high run-through speeds as desired can thereby be attained because, in spite of the fact that the run-through furnace has a reduced length for practical reasons, the tape is, nevertheless, able to be located in a zone of high temperature for a sufficiently long period of time because of the repeated passage thereof through the furnace. In one form of the method of my invention, the sandwich-like tape passes through a plurality of run-through furnaces arranged in series, and in another form of the method of my invention, the sandwich-like tape passes through a single run-through furnace repeatedly.

For a heat treatment in one or more run-through furnaces carried out in several steps, it is particularly advantageous if, at least during the last pass through the furnace, the tractive or tensile force acting on the tape or composite band is maintained substantially constant. By means of this feature of my invention, tapes or composite bands can be produced with exceptionally high critical current values distributed homogeneously over the entire length of the tape or composite band. Presumably, the fine hair-like fractures which might occur in the superconductive layers during the preceding passes through the furnace are healed by this last pass at constant tensile or tractive force and can lead to a specific reduction of the critical current intensity.

In order to hold the sandwich-type structure of the tape or composite band together well during the heat treatment, the tape is laterally guided in the run-through furnace advantageously in a suitable shaped member provided with a groove and is slightly stressed in a direction perpendicular to the direction in which the layers extend. An aluminum oxide rod provided with a groove can be advantageously employed as the shaped member. The lateral stressing of the tape can be effected by a slide member placed on top of the tape whose weight is so selected that the sandwich-type tape is not pressed together tightly but rather only sufficiently for preventing buckling of the individual component bands.

To prevent sparking or crumbling of the bands during the heat treatment due to reaction with the air, the heat treatment is preferably conducted under a protective gas such as a flowing purified argon gas, for example.

Other features which are considered as characteristic for the invention are set forth in the appended claims.

Although the invention is illustrated and described herein as method of producing superconductive tapes or bands, it is nevertheless not intended to be limited to the details shown, since various modifications may be made therein without departing from the spirit of the invention and within the scope and range of equivalents of the claims.

The method of this invention, however, together with additional objects and advantages thereof, will be best understood from the following description when read in connection with the accompanying drawings, in which:

FIGS. 1*a* and 1*b* are a schematic and greatly simplified view, in two parts due to space considerations, of apparatus for carrying out the method of my invention;

*First example*

Figure 1A:
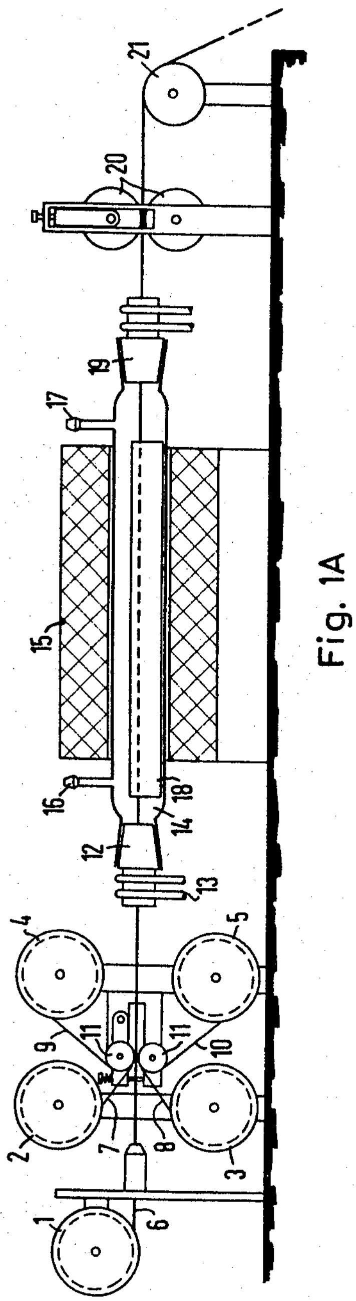
Figure 1B:
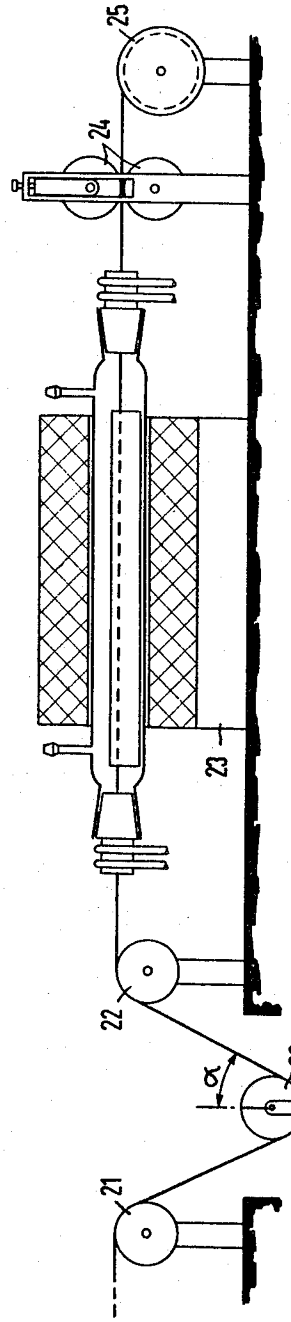

In the following example, a superconductive tape with layers of niobium-tin was produced in accordance with the method of my invention by means of the apparatus shown in FIG. 1. Two smooth niobium bands of respectively 10$\mu$ thickness and 3 mm. width, a niobium band provided on both sides with depressions and two tin bands of 10$\mu$ thickness and about 1 mm. width, served as the starting material for constructing the sandwich-type tape. To produce the niobium band having depressions on both sides thereof, a smooth niobium band of 10$\mu$ thickness and 3 mm. width was drawn between two rollers that were firmly pressed against one another. One of these rollers was a rough grinding wheel (corundum or silicon carbide), the other was made of rubber. As the niobium band ran between the rollers, it was non-uniformly deformed so that it had depressions up to about 7.5$\mu$ in depth on both sides thereof.

The bands serving as starting material were wound on the supply rollers 1 to 5 in the apparatus for carrying out the method of my invention. To construct the sandwich-type tape or composite band, the component bands thereof were unwound from the rollers 1–5, the tin bands 7 and 8 having been applied to the niobium band 6 having depressions on both sides thereof, and the smooth niobium bands 9 and 10 having in turn been applied to the tin bands 7 and 8. By means of the two pressure rollers 11 which were made of brass, the component bands were lightly pressed together. The force applied by the pressure rollers was regulated by means of suitable spring-biasing means, as shown in FIG. 1*a*, but can also be regulated by suitably applied weights. It was so adjusted that when the sandwich-type tape was drawn through the apparatus, the tin bands were entrained by the niobium bands. The sandwich-type band or tape was fed into a run-through heater through a ground steel plug or fitting 12 provided with a central slot. To prevent premature melting of the tin, the ground steel plug 12 was cooled with the aid of a copper cooling coil 13 traversed by a cooling medium such as water. The run-through heater or induction heating furnace comprised a quartz tube 14 and a tube furnace 15. The quartz tube 14 was provided with two lateral extension tubes 16 and 17 through which purified argon gas having about 1.1 atmospheres pressure was conducted through the quartz tube in a direction opposite to the direction of travel of the tape. The argon served as protective gas and simultaneously prevented entry of air through the narrow slot of the ground steel plug 12. A rod-shaped member 18 of aluminum oxide was provided in the quartz tube 14 extending in a longitudinal direction and having a groove 31 (FIG. 2) for guiding the tape. The tape was passed through the groove of this shaped member 18 and was stressed by aluminum oxide members 32 (FIG. 2) which were placed thereon. After the heat treatment, the tape was drawn out of the run-through heater through a water-cooled ground steel plug 19 provided with a slot similar to the plug 12, by means of two motor-driven rubber rollers 20. The advancing movement of the tape was solely effected by the tensile or tractive force which was produced by friction between the tape and the motor-driven rubber rollers 20. The rollers located upstream of the run-through heater were not motor driven. Thus, dislocations or buckling of the individual bands and unnecessary stresses which can cause severing of the bands were avoided.

After running between the rubber rollers 20, the tape in which the tin and niobium materials had already reacted with one another was then passed over the rollers 21 and 22 so that it formed a bend or loop between both of the rollers 21 and 22. The tape was thereafter passed through a second run-through heater 23 and subjected to a further heat treatment, the second heater 23 having substantially the same construction as that of the first heater 14, 15 described hereinabove. The tape was transported by the action of the two motor-driven rubber rollers 24 and, when completed, was wound on the roller 25.

The tape forming the loop between the rollers 21 and 22 was stressed by means of the roller 26 carrying a weight P. By this loading P it was possible to maintain the tensile stress of the tape in the run-through furnace 23 approximately constant as long as the frictional forces within the guide member 18 of the furnace 23 remained the same. A constant tensile stress was obtained with sufficient accuracy as long as the angle $\alpha$ included between the line of action of the weight P and the direction of movement of the tape, remained relatively small. In the specific example described herein, the angle $\alpha$ was about 30°. For a load P applied to the tape, a tensile stress Z was obtained in accordance with the following equation:

$$Z=\frac{P}{2\cos\alpha}+\text{frictional force}$$

In the instant example, P and Z were equal to about 100 pond.

The length of both tubular furnaces of the described apparatus for carrying out the method of my invention was about 600 mm. The tape was heated in each of the furnaces to about 1000° C. The zone in each furnace that was at a temperature of about 1000° was about 400 mm. in length. The temperature dropped off at both ends of the furnaces. Various tapes were drawn through the furnaces with a velocity of about 3 to 5 cm. per minute. These speeds correspond to a heat treatment of about 15 to 30 minutes' duration. By this heat treatment, four niobium-tin layers of approximately 2$\mu$ thickness were formed within the respective tapes.

Figure 2:
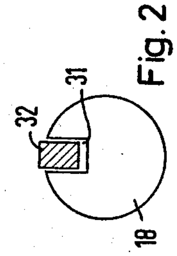
FIG. 2 is an enlarged end view, partly in cross section, of an embodiment of the shaped member shown in FIG. 1 employed for guiding the tape in the run-through furnace.

In FIG. 2 there is shown a shaped member 18 is cross-section serving for guiding the tape in the run-through furnace. In the described embodiment of the apparatus employed for carrying out the first example of the method of my invention, this shaped member consisted of an aluminum oxide rod about 800 mm. long and having a diameter of about 12 mm. A groove 31 extending in the longitudinal direction and having a rectangular cross section was formed in this aluminum oxide rod. The groove 31 had a width of 3.2 mm. and a depth of 4 mm. The 3 mm.-wide sandwich-type tape slid along the base of this groove as it was being drawn through the run-through heater, and was well-guided laterally because of the given dimensions of the groove. In order to prevent curving or buckling of the individual bands during the heat treatment, several aluminum oxide rods 32 of rectangular cross section, having a width of 3.1 mm. and a thickness of 4 mm. as well as a length of 50 mm., were placed on top of the portion of the tape located in the groove 31. Rods 32 having a weight of 2.31 grams exerted a pressure of 1.54 grams per cm.$^2$ on the tape. The advancing movement of the tape in the groove was not hampered by this slight pressure.

Figure 3:
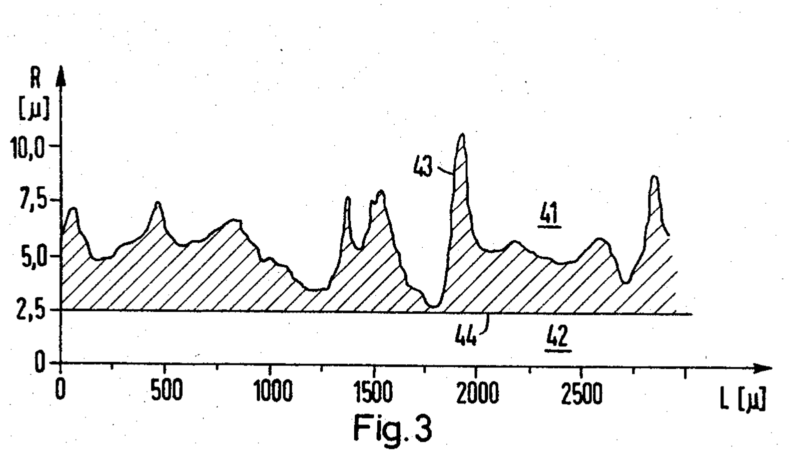
FIG. 3 is a schematic and greatly enlarged view of the surface of a niobium band provided with depressions and a smooth niobium band employed in the method of my invention.

The surface roughness of a smooth niobium band and a niobium band deformed by means of a corundum (silicon carbide) wheel which was employed in the aforementioned example is shown in FIG. 3. The deformed niobium band and the smooth niobium band are respectively shown at 41 and 42 in FIG. 3. The curve 43 represents the surface of the deformed band 41 and the straight line 44 represents the surface of the smooth band 42. The roughness depth R is shown in microns as the ordinate of the plot of FIG. 3, and the abscissa thereof indicates the length L of the illustrated band section in microns. Note must be taken of the fact that the ordinate is hundredfold greater than the abscissa. The depressions produced in the surface of the band 41 by deformation with the corundum wheel are clearly visible in FIG. 3. The opposite surface of the band 41 (not shown in FIG. 3) has correspondingly similar depressions. The maximum depth of roughness is about 7.5$\mu$, the mean depth of roughness being about 5$\mu$. The volume available for the tin, when both bands 41 and 42 are superimposed in the form of a sandwich, can be calculated from the hatched area located between the surface lines 43 and 44 in FIG. 3. The amount of tin to be introduced between both bands 41 and 42 and which is supposed to fill in the interspace between the bands in molten state during the heat treatment can thus be estimated in a simple manner. In the first example given hereinabove, the depressions in the surface of the deformed niobium band 41 were about 5$\mu$ average depth and covered about half of the surface. Consequently the mean spacing of the surface of the deformed niobium band 41 from the surface of the undeformed niobium band 42 was about 2.5$\mu$. Thus, for bands that were 3 mm. in width, a tin layer having a mean width of 3 mm. and a thickness of 2.5$\mu$ was required for filling the interspace between the bands 41 and 42. The tin was introduced in the form of a 10$\mu$ thick band between both niobium bands 41 and 42, the required width of the tin band being about 0.75 mm. A tin band having these dimensions exactly forms a thin layer having a mean width of 3 mm. and a thickness of about 2.5$\mu$ when melted at the beginning of the heat treatment. In the aforementioned example, the tin band was chosen to be somewhat wider, namely 1 mm. wide. Sufficient tin for reacting with the adjacent niobium bands 41 and 42 to form the superconductive layers was thereby made available.

Figure 4:
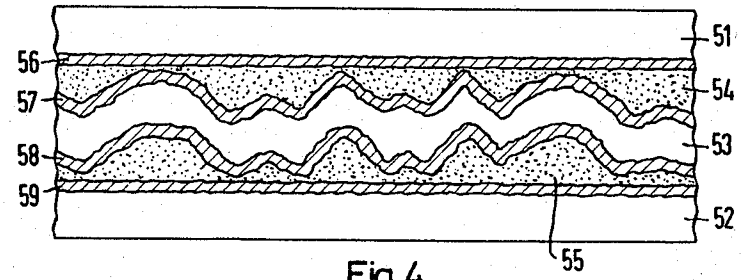
FIG. 4 is a schematic and greatly enlarged longitudinal sectional view of a ground portion of a superconductive tape produced according to the method of my invention.

A schematic and greatly enlarged view of a portion of a superconductive tape produced in accordance with the aforedescribed first example of the method of my invention is shown in FIG. 4. Substantially unreacted volumes of tin 54 and 55 are shown located respectively between both external smooth niobium bands 51 and 52, on the one hand, and the inner-located niobium band 53 formed on both sides with depressions. At the boundary surfaces between the niobium bands 51, 52 and 53, the tin was indiffused into the niobium bands and reacted therewith to form the superconductive niobium-tin layers 56, 57, 58 and 59, which were about 2$\mu$ thick. The layers 57 and 58 were on the average about 5$\mu$ from the neutral axis or fiber and the layers 56 and 59 were about 8$\mu$ distant from the neutral axis or fiber. The entire sandwich-type composite band or tape was about 43$\mu$ thick. In order to represent the deformation of the niobium band 53 better, the scale perpendicular to the band surface in FIG. 3 is shown a hundredfold larger than the scale in the longitudinal direction of the band. The mechanical properties of the superconductive tape are very good. The tape has a tensile strergth of about 38.5 kp./cm.$^2$ and is furthermore very flexible. When the tape is bent around a mandrel having a diameter of 10 mm., no residual deformations take place therein. The superconductive properties of the tape are practically unimpaired by bending around this mandrel.

Figure 5:
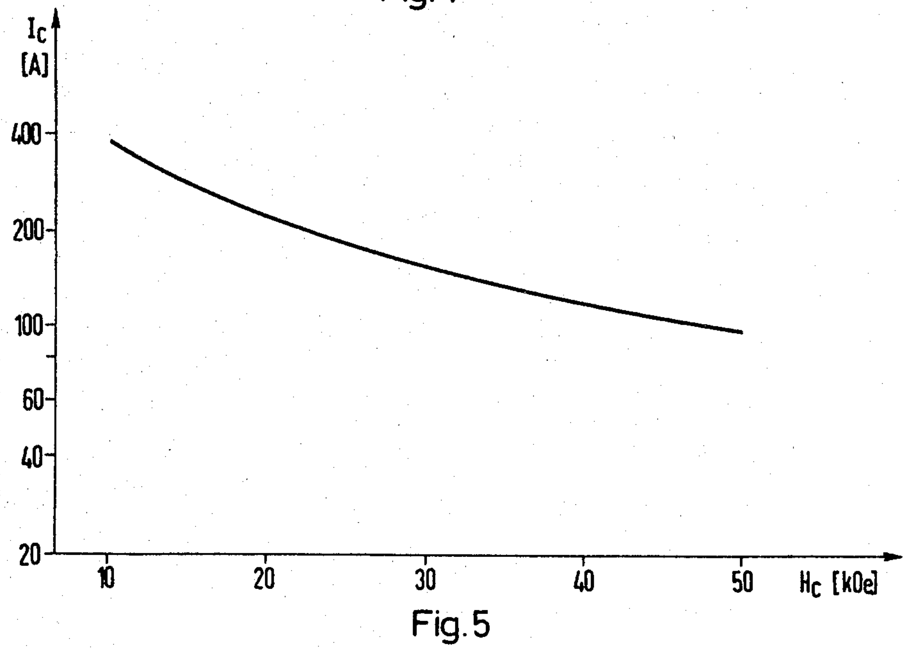
FIG. 5 is an $I_C H_C$-plot of the tape of FIG. 4.

The superconductive tapes produced in accordance with the method of my invention have outstanding electrical properties. They are also capable of being loaded with high currents when subjected to very strong magnetic fields. FIG. 5 shows the so-called $I_CH_C$ curve of a superconductive tape produced as in the aforedescribed first example which has the construction shown in FIG. 4. The $I_CH_C$ curve is determined by subjecting the superconductive tape to strong magnetic fields and increasing the current loading until the tape transforms from superconductive to normally conductive state. The current intensity at which this transition occurs is designated as the critical current intensity $I_C$. As aforementioned, in FIG. 5 the critical current intensity $I_C$ in amperes is shown in logarithmic scale along the ordinate. The magnetic field strength is indicated, on the other hand, in kilo-oersted (koe.) on linear scale along the abscissa. As can be determined from the curve in FIG. 5, the superconductive tape produced according to the method of my invention, which has four niobium-tin layers in the interior thereof, is capable of being loaded in a magnetic field of about 13 koe. with a current of about 300 A., and in a magnetic field of 50 koe. with a current of about 100 A. With a tape width of 3 mm. and a tape thickness of about 43$\mu$, a critical current density of about $8 \cdot 10^4$ A./cm.$^2$ is produced for a magnetic field of 50 koe. The tape is thus exceptionally suitable for superconductive magnetic coils.

*Second example*

In a further example of the method of my invention, a superconductive tape with niobium-tin layers was produced wherein the introduction of the tin between the niobium bands was effected by suitably coating a niobium band therewith. The apparatus shown in FIG. 1 was again used for producing the superconductive tape in accordance with this second example. Three smooth 3 mm.-wide and 10$\mu$-thick niobium bands served as the starting material. The niobium band which was to lie in the middle when forming the sandwich-type tape was coated electrolytically with a tin layer of about 5$\mu$ thickness. The tin-coated band was drawn between a corundum grinding wheel and a rubber wheel which were closely pressed against one another. The niobium band was therefore so deformed that it has depressions on both sides thereof. The coating of the niobium band with tin could also, however, have taken place after deformation of the band. The coated band was placed on the supply roll 1 and both smooth uncoated niobium bands were respectively placed on the supply rolls 4 and 5. The supply rolls 2 and 3 were not used so that in this respect, a simplification of the method was afforded. The heat treatment was carried out in the same manner as for the above-described first example. The completed tape exhibited a critical current intensity of 137 A. in a magnetic field of 50 koe.

The method of my invention can be varied in many different ways as compared to the aforedescribed examples. Particularly, by lengthening the run-through furnaces, the through-put speed of the tape can be even further increased. Furthermore, the heat treatment can be carried out in such a way that the tape passes through the same furnace several times. For this purpose, suitable reversing rollers can be provided at both ends of the furnace. If one were, for example, to draw the tape three times through a furnace 120 cm. in length and having a high temperature zone of about 100 cm. length and a furnace temperature of about 1000° C., a drawing or through-put speed of about 20 cm. per minute can be achieved. Furthermore, the drawing speed can be increased further by increasing the furnace temperature to about 1200° C. Consequently, the method of my invention is suitable for efficient production of superconductive tapes of relatively great length.

To produce tapes of very great length (more than 1000 meters), even if bands of the higher melting component material are not available in suitable length, shorter band portions of this material can be welded together before constructing the sandwich-type tape.

I claim:

1. Method of producing superconductive tapes having layers of a superconductive two-component intermetallic compound which comprises interposing a substance consisting of one component of a superconductive two-component intermetallic compound having a melting point lower than that of the other component of the compound between respective pairs of an odd number of adjacent bands formed of a substance consisting of the other higher-melting component of the compound, one of the bands, respectively, of the pairs of bands being smooth and the other being provided with depressions on both sides thereof, and subjecting the sandwich of bands thus formed to heat treatment so as to indiffuse the lower-melting component into the higher-melting component whereby the components react to form layers of the superconductive intermetallic compound; the depth of the depressions in the other band of the pairs of bands and the quantity of lower-melting component being predetermined so that the lower-melting component is retained between the bands of the higher-melting component by capillary action while the sandwich of bands is subjected to the heat treatment.

2. Method according to claim 1 wherein theree adjacent bands of the higher-melting component are employed in forming the sandwich-type tape, the intermediate one of the three bands being provided with the depressions on both sides thereof.

3. Method according to claim 1 wherein the depressions of at least one of the bands formed therewith are about 2 to 15$\mu$ deep.

4. Method according to claim 1 which includes rolling a roller with a rough surface over a band of a substance consisting of the higher-melting component so as to irregularly deform it to produce the band provided with depressions on both sides thereof.

5. Method according to claim 1 wherein the lower-melting substance interposed between the bands of higher-melting substance is also in the form of a band.

6. Method according to claim 1 wherein the lower-melting substance is interposed between adjacent bands of the pairs of bands by coating each alternate band with a layer of the lower-melting substance.

7. Method according to claim 1 wherein the quantity of lower-melting component substance interposed between adjacent bands of higher-melting component substance is substantially exactly necessary to fill the interspaces formed by the depressions therebetween and to form a layer of the superconductive compound of about 1 to 2$\mu$ thickness on the adjacent bands respectively.

8. Method according to claim 1 wherein the heat treatment is carried out at temperatures between about 950 and 1200° C. for a period ranging from several minutes to several hours.

9. Method according to claim 1 wherein the heat treatment is carried out in several steps in at least one run-through furnace.

10. Method according to claim 1 wherein the heat treatment is effected by repeatedly passing the sandwich of bands through a run-through furnace, the tensile force applied to the sandwich of bands being held constant at least during the last pass thereof through the furnace.

11. Method according to claim 1 wherein the heat treatment is effected by passing the sandwich of bands along a guiding groove formed in a shaped member disposed in a run-through furnace and by lightly stressing the sandwich of bands during the pass through the groove.

12. Method according to claim 1 wherein the heat treatment is conducted in a protective gas atmosphere.

13. Method according to claim 1 wherein the higher-melting component is an element selected from the group consisting of vanadium, niobium and tantalum, and the lower-melting component is an element selected from the group consisting of aluminum, gallium and tin.

14. Method according to claim 1 wherein the higher-melting component consists of niobium and the lower-melting component consists of tin.

15. Method according to claim 1 for producing relatively long lengths of tape which comprises initially welding together relatively shorter lengths of the individual bands of the higher-melting component substance.

References Cited

UNITED STATES PATENTS

| | | | |
|---|---|---|---|
| 2,451,099 | 10/1948 | LaMotte | 29—472.1 |
| 3,181,936 | 5/1965 | Denny et al. | 29—194 |
| 3,218,693 | 11/1965 | Allen et al. | 29—599 |
| 3,256,118 | 6/1966 | Speidel | 29—528 X |
| 3,310,862 | 3/1967 | Allen | 29—599 |
| 3,352,008 | 11/1967 | Fairbanks | 29—599 |

JOHN F. CAMPBELL, *Primary Examiner.*

PAUL M. COHEN, *Assistant Examiner.*

U.S. Cl. X.R.

29—194, 472.3, 482, 488, 502, 999